United States Patent [19]
Greenberg et al.

[11] Patent Number: 5,952,412
[45] Date of Patent: Sep. 14, 1999

[54] PELLETIZED RUBBER

[75] Inventors: Lee M. Greenberg, Creve Coeur; Judy A. Smith, St. Louis, both of Mo.

[73] Assignee: Green Edge Enterprises, L.L.C., St. Louis, Mo.

[21] Appl. No.: 09/044,429

[22] Filed: Mar. 19, 1998

[51] Int. Cl.$^6$ .............................. C08C 19/00; C08J 7/00; C08L 17/00
[52] U.S. Cl. .......................... 524/270; 524/274; 524/849; 524/855; 425/DIG. 101
[58] Field of Search ..................... 524/270, 274, 524/849, 855; 425/DIG. 101

[56] References Cited

U.S. PATENT DOCUMENTS

| | | | |
|---|---|---|---|
| 3,801,421 | 4/1974 | Allen et al. | 161/67 |
| 5,312,573 | 5/1994 | Rosenbaum et al. | 264/37 |
| 5,385,401 | 1/1995 | Nath | 366/1 |
| 5,397,825 | 3/1995 | Segrest | 524/270 |
| 5,488,080 | 1/1996 | Osborn | 524/270 |

*Primary Examiner*—Nathan M. Nutter
*Attorney, Agent, or Firm*—Haverstock, Garrett & Roberts

[57] ABSTRACT

The present invention relates to rubber pellets made of an amount of vulcanized rubber and an amount of binder, with the vulcanized rubber preferably being discarded rubber. Additionally, the rubber pellets will preferably contain an amount of filler materials which are plastic or rubber or combinations thereof so that the preferred rubber pellet contains an amount of rubber equal to between about 50% and about 95% by weight of the rubber pellet, an amount of filler material equal to between about 0 and about 45% by weight of the rubber pellet, and an amount of binder equal to between about 5% and about 10% by weight of the rubber pellet. The rubber pellets are used in the formation of asphalt and are desirable because they provide necessary constituents to the asphalt and allow for elimination of equipment and separate ingredient addition steps from the asphalt formation process. The present invention is also desirable because it provides for a way to desirably dispose of waste rubber materials.

11 Claims, No Drawings

PELLETIZED RUBBER

FIELD OF THE INVENTION

The present invention relates to rubber pellets made from discarded rubber and a liquid binder, with such pellets preferably containing an amount of filler material. The rubber pellets are preferably used to produce asphalt, so that the rubber pellets provide specific amounts of ingredients to an asphalt production process thereby eliminating separate ingredient addition steps. As such, the rubber pellets provide the necessary ingredients for forming asphalt so that some of the asphalt ingredients do not have to be added separately. Additionally, the present invention relates to a method of disposing of waste rubber material and a method for eliminating asphalt ingredient addition steps.

BACKGROUND OF THE INVENTION

Traditionally, the manufacture of automobile tires has generated large amounts of vulcanized rubber waste material. When making automobile, truck, and airplane tires, to name a few types of rubber materials made from vulcanized rubber, excess rubber cures on the outside portion of the tire. The inclusion of the excess rubber on the tire is undesirable, consequently it is the practice in the tire industry to grind, sand, or buff the excess rubber off the tire. This action creates waste rubber material generally referred to in the rubber industry as RIS grindings, rubber buffings, or crumb rubber, with the waste rubber material generally disposed of using traditional waste disposal methods, such as burial in a landfill. This is undesirable because landfill space is scarce and disposing of such materials can be expensive.

The waste rubber material is typically disposed of because there are very few known uses for such material as it tends to be of a small dust like size. When the waste rubber material has a small particle size, not only does it have few uses, but it is difficult to handle. The waste rubber material tends to clump together if it is wet, so as to form large clumps of rubber material. If the waste rubber material is dry it tends to dissipate easily. As such, while asphalt production methods often require the addition of vulcanized rubber, especially styrene-butadiene, the inclusion of waste rubber material in the asphalt formation process tends to be undesirable and impractical. The primary problem with using the waste rubber material, in particular rubber tire waste, to form the asphalt is that the asphalt formation process produces faulty asphalt if large clumps of rubber are added to the process and currently the waste rubber material tends to clump into large chunks of rubber. Further, waste rubber material often contains waste material, such as cigarette butts, metal, aluminum cans, and a variety of other types of waste generated in a tire manufacturing facility which can result in the production of faulty asphalt. Thus, it would be desirable to have a method or composition for disposing of waste rubber material in a useful way. It would also be desirable to have a method for using waste rubber material in an asphalt formation process.

It is known to use rubber materials in the formation of asphalt and, in particular, rubber can be used in association with an asphalt formation system owned and marketed by Polyphalt® of Toronto, Canada. The Polyphalt® system uses a variety of disposable rubber and plastic materials to form high quality asphalt, with tire rubber being one of the waste materials suitable for use in the Polyphalt® system. Vulcanized rubber in particular, is generally required for use in the formation of asphalt compositions made according to the Polyphalt® method. While waste tire rubber is suitable for use in the asphalt formation system, the handling characteristics and size of the waste tire rubber is undesirable. Once again, the waste tire rubber particles tend to stick together to form agglomerated clumps of rubber which means the rubber waste can not be used in the Polyphalt® asphalt formation system. Thus, while waste rubber is an acceptable type of rubber for use in the Polyphalt® system, the handling characteristics of the waste rubber make it essentially unavailable for use. As such, it would be desirable to have a method or composition which would allow the easy use of waste rubber in an asphalt formation system.

When asphalt is formed according to the Polyphalt® system, the method of formation requires the addition of rubber constituents and plastic constituents. Typically, the rubber and plastic constituents are added separately so that the addition of each specific constituent ingredient requires a separate holding device and separate addition step in the asphalt formation process. The requirement of separate pieces of equipment to hold and add the constituent ingredients makes the asphalt formation process more expensive than if the machinery was not required. Thus, it would be desirable to have a method or composition that eliminates the separate addition steps for some of constituent ingredients and that eliminates the need for some pieces of equipment.

SUMMARY OF THE INVENTION

The present invention relates to the formation of rubber pellets which are comprised of vulcanized rubber and a liquid hinder. Preferably, the vulcanized rubber has been discarded as a waste material so that the vulcanized rubber will likely be inexpensive to use. Further, it is preferred for the rubber pellets to be further comprised of an amount of filler material, which can be plastic, rubber, or combinations thereof. When the constituents are mixed together the rubber pellets will be comprised of an amount of rubber equal to at least 50% by weight of the rubber pellets and an amount of binder equal to at least 5% by weight of the rubber pellets. Also, if the filler material is included in the composition used to form the rubber pellets, the filler material will be present in an amount equal to from about 0% to about 45% by weight of the rubber pellets.

The rubber pellets are particularly desirable because they allow for the useful disposal of waste rubber materials and can be used to form high quality asphalt. With regards to the asphalt, the rubber pellets are desirable because they combine constituents in proper amounts which are necessary to form the asphalt. As such, this allows for elimination of equipment and ingredient addition steps. The rubber pellets combine many of the synthetic ingredients which are necessary to form the asphalt in one composition, so that the asphalt can be more easily formed, because the ingredients are combined into one composition instead of several separate ingredients that must be added separately.

The desirability of the rubber pellet allowing for the disposal of discarded waste vulcanized rubber should not be discounted. Disposing of waste vulcanized rubber can be expensive and undesirable, especially considering the present movement towards environmentalism. Traditionally, waste rubber had very few applications for which it could be used, as such it was typically buried in landfills where it would remain. Even when applications were found for the waste rubber it was still often an undesirable material to use because it is difficult to handle. The rubber tends to agglomerate into large chunks when it is moist and when it is dry it tends to dissipate easily and cover nearly everything it contacts. For these reasons the present method and composition are especially beneficial because the rubber pellets are easy to handle and use, and because the rubber pellets provide a means for disposing of waste rubber material economically. Also, the rubber pellets are desirable because they are essentially allowing for the recycling of the waste rubber material, which is environmentally desirable. Thus, the rubber pellets are useful in asphalt formation and provide a ready way to desirably and easily dispose of waste rubber material.

DETAILED DESCRIPTION OF THE PREFERRED EMBODIMENT

The present invention relates to rubber pellets, which allow for a desirable way of disposing of discarded rubber and which are used in forming high quality asphalt. The rubber pellets are preferably comprised of an amount of vulcanized rubber and an amount of binder. The vulcanized rubber is most preferably derived from discarded waste rubber, especially discarded tire rubber, having a small particle size so that it is similar to rubber dust. The rubber pellets can contain other constituents besides vulcanized rubber; however, it is necessary that the rubber pellets are comprised of at least 50% by weight of vulcanized rubber.

The rubber pellets are preferably used in the formation of asphalt and will most preferably contain constituents referred to as filler material, in addition to the rubber, with the filler material generally necessary to form the asphalt. Such filler materials are different types of plastics and rubbers, so that the rubber pellets include a number of different constituent ingredients necessary to form the asphalt. By combining these constituent ingredients into a rubber pellet, the ingredients necessary to form asphalt are added in one step instead of a number of separate steps. Also, because different types of asphalt require different constituent ingredients in different amounts, the type and amount of filler material comprising the rubber pellets will vary according to the specific type of asphalt to be formed. It is determined in advance what types and how much filler material is to be included in the rubber pellets, so that when the rubber pellets are formed the constituent requirements for a particular type of asphalt are met.

Vulcanized rubber is required to form the rubber pellets and discarded vulcanized rubber is the most preferred type of rubber for forming the rubber pellets. The vulcanized rubber is required because it sticks together to form a pellet and, most importantly, it is ideal and required for the formation of most types of asphalt. It is also necessary for the rubber to have a small particle size, so that the rubber can be agglomerated to form rubber pellets of a size ranging between about 2.5 millimeters and about 10 millimeters in diameter and about 2.5 millimeters and about 20 millimeters in length.

The rubber pellets can, in addition to the vulcanized rubber and binder, contain a variety of other constituents; however, all amount of vulcanized rubber equal to at least 50% by weight of the rubber pellet mixture used to form the rubber pellets is required so that each rubber pellet is preferably comprised of an amount of rubber equal to at least 50% by weight of the rubber pellet. The specific percentage of rubber in the rubber pellets will generally be determined by the percentage of rubber required in the formation of a particular type of asphalt. Consequently, the amount of rubber used to make the rubber pellets will be equal to from about 50% to about 95% by weight of the rubber pellet mixture.

Any vulcanized rubber can be used to make the rubber pellets, so long as the rubber can be used to form asphalt and the rubber sticks together to form the rubber pellets. The vulcanized rubber used to form the rubber pellets can be selected from the group consisting of styrene-butadiene rubber, butyl rubber, polybutadiene rubber, and combinations thereof, however, other types of vulcanized rubber can also be used. The most preferred vulcanized rubber for use in forming the rubber pellets is styrene-butadiene rubber. This is because styrene-butadiene rubber is readily available, as it is most often used to form car tires, and it is a desirable, and often required, constituent for forming asphalt. Again, however, the particular vulcanized rubber used to form the rubber pellets for forming the asphalt will be selected based on the particular type of asphalt to be formed.

Not only is vulcanized rubber preferred, but discarded vulcanized rubber is most preferred. Discarded vulcanized rubber can be obtained from a variety of sources, such as waste rubber dust derived from grinding excess rubber off of newly produced truck, automobile, or airplane tires and other types of waste rubber produced during the production of tires. When tires are produced they are normally sanded, so that the sanding process produces waste rubber dust, better known as RIS grindings or rubber buffings. Tire production is not the only source of discarded vulcanized rubber, but it is the preferred source. The rubber pellets can be made from other forms of vulcanized rubber which includes other types of discarded waste rubber. Non-discarded vulcanized rubber can also be used, such as newly formed vulcanized rubber. Discarded rubber is preferred, however, because it is cheaper and it is a waste material which means it is desirable to usefully dispose of such material instead of burying it in a landfill, for example. Regardless of the specific source of vulcanized rubber, any vulcanized rubber can be used to form the rubber pellets.

The rubber used to make the rubber pellets can be of a variety of sizes and dimensions, but, as mentioned, it is most preferred for the rubber to have a small particle size. As such, the rubber will generally be of a size that passes through a U.S. filter sieve ranging between about a #10 mesh and about a #200 mesh. It is most preferred for the rubber dust to have an average particle size ranging between about a #100 mesh particle size and a #200 mesh particle size. A specific particle size, however, is not important as long as the rubber can be formed into the rubber pellets and can be readily used in the asphalt formation process.

A variety of filler materials can be added to the rubber and binder mixture to form the rubber pellets. The filler material mixed with the rubber will be determined by the final use of the rubber pellets, so that the rubber pellets can contain different types and amounts of filler material constituents dependent on the particular type of asphalt formed. Thus, the types and amounts of filler material added to the rubber pellet mixture will be determined by the asphalt composition to be made with the rubber pellets. Preferably, the filler material contains an amount of plastic and rubber. Included among the types of plastic that can be used as filler materials are polystyrene, polyethylene, polypropylene, polyurethane, nylon, and combinations thereof. Other plastics or rubbers may be used dependent upon the requirements for forming a particular type of asphalt. The amount of filler material added to the rubber binder mixture will be dependent upon the requirements of the asphalt composition. Generally, the filler material is added to the rubber binder mixture in an amount equal to between about 0% and about 45% by weight of the rubber pellet mixture. Also, the filler material will have the same particle size as the rubber material.

As mentioned, in addition to requiring an amount of rubber, the rubber pellets require an amount of binder for proper formation of the pellets. The binder is added to the rubber to cause the rubber particles and filler materials, if they are added, to stick together. Also, the binder can be a desired ingredient in forming asphalt. Without the binder it is difficult to pelletize the rubber into rubber pellets, especially if there are filler materials besides rubber to be included in the rubber pellets. When the binder is added to the rubber, a rubber and binder mixture is formed which can be readily pelletized to form the rubber pellets.

The binder can be selected from a variety of liquid constituents including water, liquid hydrocarbons, sulfur, sulfur paste, and combinations thereof. Generally the binder should have a density equal to between 0.75 g/cc and 1.25 g/cc, and preferably a density closer to 1.0 g/cc. A variety of hydrocarbon liquid binders can be used, but the most preferred liquid hydrocarbon binder is liquid asphalt because it is a desirable constituent for forming asphalt. Another liquid hydrocarbon binder that can be used is an extender oil. Regardless of the specific type of binder, it is necessary to add the binder to the rubber in an amount equal to from about 5% to about 10% by weight of rubber pellet mixture.

The rubber pellets can be used as a part of a method to desirably dispose of waste rubber materials and as part of a method to form an asphalt that involves fewer ingredient addition steps. The methods of disposal of rubber and elimination of formation steps are accomplished by a method for forming the rubber pellets, so that the rubber pellets are made by pelletizing the mixture of rubber, binder, and filler materials to form the rubber pellets. All three methods are discussed together.

The first step in forming the rubber pellets involves obtaining an amount of waste rubber, which has preferably been discarded. This rubber can be readily obtained from a tire production plant. It should be kept in mind that to form the rubber pellets discarded rubber is not required, only vulcanized rubber is required. Once an amount of rubber is obtained, if it is discarded or waste rubber, it will most likely contain contaminant debris so that the next step is to remove such contaminant debris from the rubber. The types of debris mixed in with the rubber dust include cigarette butts, bits of metal, aluminum cans, and other types of garbage. While a variety of methods can be used to remove the debris, the most preferred way involves passing the rubber through a sifter so that as the rubber passes through the sifter the contaminants remain on the sifter screen. An example of a suitable sifter is a Rotex screener having a ½ inch screen. This method of removing debris is also preferred because it allows for the removal of rubber particles that are too big to be used to form the rubber pellets. Any method, however, can be used so long as the debris and large chunks of rubber are adequately separated from the rubber used to form the rubber pellets.

After removal of debris, the rubber, as well as, the filler material will be passed through a plurality of filters which are U.S. sieve filters having a size ranging between about a U.S. #10 mesh screen and about a U.S. #200 mesh screen. This allows the user to obtain rubber material and filler material suitable for use in forming the rubber pellets.

After the rubber is separated from the debris and large rubber particles, the rubber is preferably transferred to a mixing, chamber where the rubber is mixed with an amount of binder. As was discussed, the binder will be added in an amount ranging between about 5% and 10% by weight of the rubber pellet mixture and the rubber will be added in an amount ranging between about 50% and about 95% by weight of the rubber pellet mixture. At this point, if it is desired, the filler material can also be added to the rubber binder mixture. The filler material will be added in an amount ranging between about 0% and about 45% by weight of the rubber pellet mixture. Any method of mixing the rubber binder mixture can be used so long as the rubber, binder, and filler material are thoroughly mixed. A paddle mixer is an example of a device that can be used to mix the rubber, binder, and filler material, keep in mind, however, that other devices can be used to mix the constituents used to form the rubber pellets. Before placement in the mixer, the rubber, binder, and filler material constituents can be stored in separate reservoirs or hoppers.

After thoroughly mixing the rubber, binder, and filler material constituents the rubber binder mixture is transferred to a machine designed to pelletize the mixture and form the rubber pellets. Preferably, the pelletizer machine is used to form the rubber pellets, but any machine can be used that will form rubber pellets. The rubber pellet mixture will be compressed by the pelletizer machine into rubber pellets of a size having a diameter ranging between about 2.5 millimeter and about 10 millimeters and a length ranging between about 2.5 millimeters and about 20 millimeters. The most preferred rubber pellets will have a size that is about 5 millimeters in diameter and about 10 millimeters in length. The size of the rubber pellets will be selected before pelletizing so that the rubber pellets formed will generally be of a uniform size and will meet the size requirements for forming asphalt. A variety of machines can be used to pelletize the rubber dust mixture; however, a Century 100 hp manufactured by the California Pellet Mill company or the 501 HL Ace manufactured by Sprout Walder are the two most preferred pelletizers.

Once the rubber pellets are formed, they can be optionally cured for a period of time. Preferably, the rubber pellets are cured at ambient temperature for about 24 hours. Other times and temperatures, however, can be used.

Upon formation of the rubber pellets they are ready for use in a variety of applications. The preferred application includes using the rubber pellets in the formation of asphalt. The rubber pellets are ideal for use in the formation of the asphalt because the pellets are of a desired size that can be readily blended into the asphalt mixture. Also, the pellets can be comprised of a variety of filler materials necessary to the formation of the asphalt, with the rubber pellets collectively containing the desired amount of constituents. When the filler materials are included in the rubber pellets, machinery and ingredient addition steps can be eliminated from the asphalt formation process. The rubber pellets can also be used in the asphalt roof industry. Not only are the rubber pellets ideal for the formation of asphalt, but the rubber pellets are desirable because they provide a desirable means for disposing of waste rubber materials.

EXAMPLES

Example 1

A plurality of rubber pellets having a size equal to about 5 millimeters in diameter and 10 millimeters in length were made by cleaning 10 pounds of styrene-butadiene rubber dust having a size equivalent to a size ranging between about a U.S. #50 mesh screen and about a U.S. #200 mesh screen. The rubber dust was cleaned by a pair of workers who sifted through the dust to remove debris such as paper, cigarette butts, soda cans, metal, and other types of debris. The rubber dust then passed through a hand sifter that was a U.S. mesh size #50, which further separated debris from the rubber. The rubber dust was obtained from the Goodyear ® Tire Plant in Fort. Wayne, Ind. and was waste resulting from manufacturing tires, including airplane, automobile, and truck tires. When the tires are formed they have excess rubber present on the exterior surface, because the rubber is undesirable, it is necessary to grind the rubber off the tires. As the grinding step occurs rubber dust is created, with the rubber dust considered a waste product. As such, the rubber dust is typically disposed of by placing it in a landfill. The rubber dust was styrene-butadiene rubber.

Once the rubber dust had the debris removed an amount of rubber dust equal to 10 pounds was then mixed with an amount of water to one pound or 10% by weight of the rubber dust. The rubber and water were thoroughly mixed by hand in a bucket by stirring the rubber and water. Once the rubber water mixture was formed, the mixture was fed into a pellet mill which was a Century 100 hp manufactured by the California Pellet Mill Company. The rubber water mixture was then formed into a plurality of rubber pellets that were approximately 5 millimeters in diameter and 10 millimeters in length.

The rubber pellets were then used in the formation of asphalt, with the asphalt made according to the Polyphalt® process. The rubber pellets proved to be desirable for use in the asphalt industry because the pellets were easily blended into the asphalt mix and formed a desirable asphalt. The rubber pellets were especially desirable because they provide for an easy way to dispose of waste rubber find because the pellets were non-clumping and easily transported and packaged.

Thus, there has been shown and described a novel method and composition relating to rubber pellet compositions which fulfill all the objects and advantages sought therefore. It is apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A rubber pellet for use in forming asphalt, wherein said rubber pellet has a diameter size ranging between about 2.5 millimeters and about 10 millimeters and length ranging between about 2.5 millimeters and about 20 millimeters, with said rubber pellet comprised of an amount of vulcanized rubber equal to between about 50% by weight and 95% by weight of said rubber pellet and an amount of binder equal to at least 5% by weight of said rubber pellet, with the vulcanized rubber being discarded rubber and the binder having a density equal to between 0.75 g/cc and about 1.25 g/cc.

2. The rubber pellet of claim 1 wherein said rubber pellet contains an amount of filler material required for forming the asphalt, with the filler material equal to from about 0% to about 45% by weight of said rubber pellet, the filler material is included in said rubber pellet composition so that separate ingredients for forming the asphalt will be combined in said rubber pellet thereby eliminating separate ingredient addition steps in the asphalt formation process.

3. The rubber pellet of claim 2 wherein the filler material is selected from the group consisting of polyethylene, polystyrene, polypropylene, polyurethane, nylon, and combinations thereof.

4. The rubber pellet of claim 1 wherein the vulcanized rubber is of a particle size that passes through a U.S. filter sieve having a screen size ranging between about #10 and about #200.

5. The rubber pellet of claim 2 wherein the filler is of a particle size that passes through a U.S. filter sieve having a screen size ranging between about #10 and about #200.

6. The rubber pellet of claim 1 wherein the discarded rubber is selected from the group consisting of reclaimed automobile tires, truck tires, airplane tires, and rubber dust from tires.

7. The rubber pellet of claim 1 wherein said binder has a density preferably about 1.0 g/cc.

8. The rubber pellet of claim 1 wherein the vulcanized rubber is selected from the group consisting of styrene-butadiene rubber, butyl rubber, polybutadiene rubber, and combinations thereof.

9. The rubber pellet of claim 1 wherein the binder is a liquid selected from the group consisting of water, hydrocarbons, sulfur, sulfur paste, and combinations thereof.

10. The rubber pellet of claim 9 wherein the hydrocarbon binder is selected from the group comprised of liquid asphalt, extender oil, and combinations thereof.

11. The rubber pellet of claim 1 wherein the binder is preferably added in an amount ranging between about 5% and about 10% by weight of said rubber pellet.

* * * * *